United States Patent [19]

Weber

[11] Patent Number: 4,505,991
[45] Date of Patent: Mar. 19, 1985

[54] SODIUM HEAT ENGINE ELECTRICAL FEEDTHROUGH

[75] Inventor: Neill Weber, Dearborn, Mich.

[73] Assignee: Ford Motor Company, Dearborn, Mich.

[21] Appl. No.: 614,409

[22] Filed: May 25, 1984

[51] Int. Cl.$^3$ ............................................... H01M 6/36
[52] U.S. Cl. ...................................... 429/11; 429/104; 429/112; 429/181
[58] Field of Search ................ 429/11, 101, 102, 104, 429/112, 181

[56] References Cited

U.S. PATENT DOCUMENTS

| | | |
|---|---|---|
| 687,121 | 11/1901 | Callender . |
| 1,379,854 | 5/1921 | Dinnin . |
| 3,458,356 | 7/1969 | Kummer et al. ...................... 136/83 |
| 3,847,675 | 11/1974 | Sharma ............................... 136/133 |
| 4,049,877 | 9/1977 | Saillant et al. ........................ 429/11 |
| 4,212,931 | 7/1980 | Cadart et al. ........................ 429/104 |
| 4,326,016 | 4/1982 | Selover, Jr. et al. ................ 429/184 |

Primary Examiner—Charles F. LeFevour
Attorney, Agent, or Firm—Lorraine S. Melotik; Roger L. May

[57] ABSTRACT

A thermoelectric generator device which converts heat energy to electrical energy. An alkali metal is used with a solid electrolyte and a hermetically sealed feedthrough structure.

10 Claims, 4 Drawing Figures

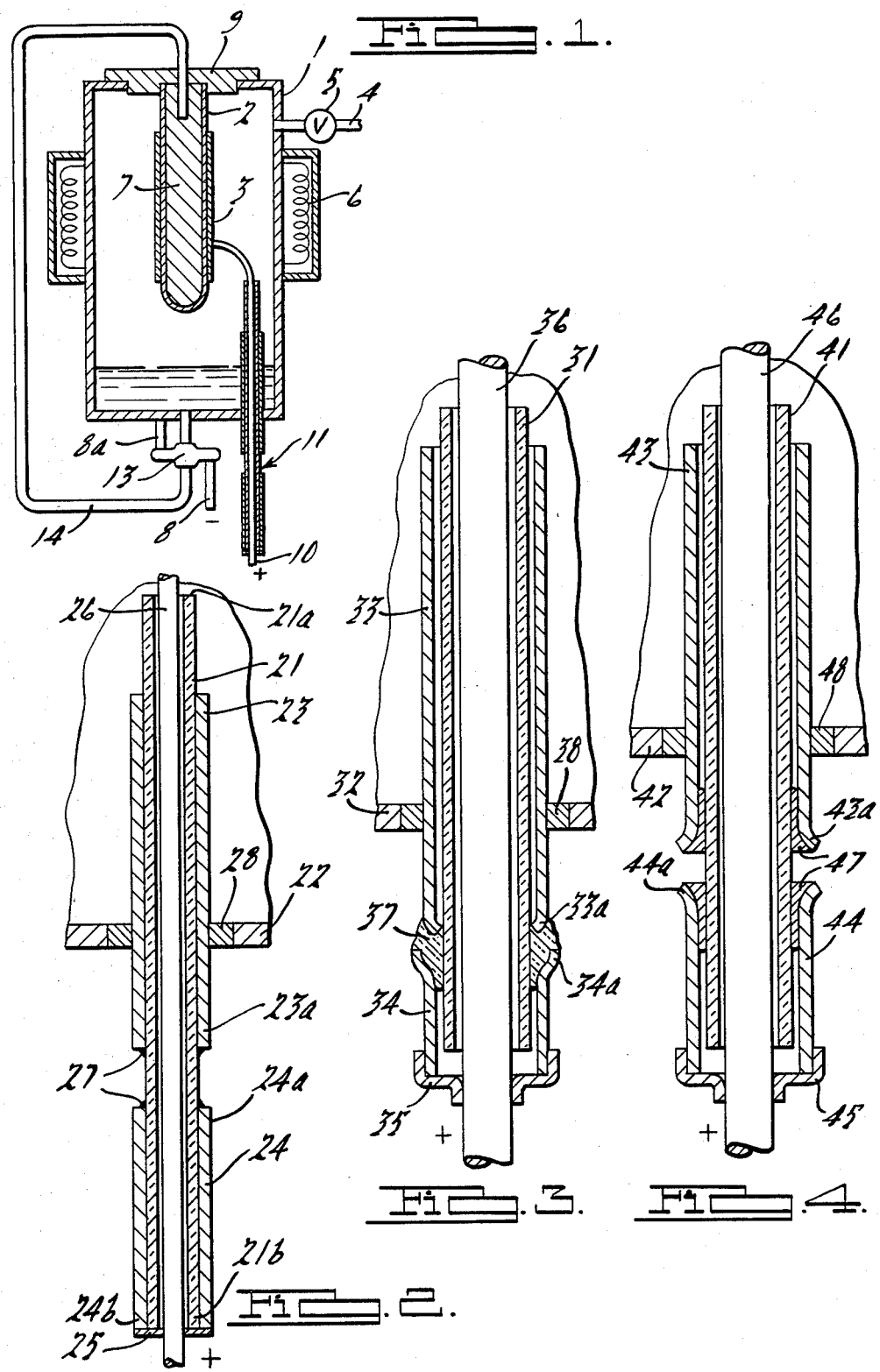

SODIUM HEAT ENGINE ELECTRICAL FEEDTHROUGH

This invention was made under contract with or subcontract thereunder of the Department of Energy Contract Number DE-AC02-79ER10347.

This invention relates to thermoelectric generator devices which convert heat energy from a heat source directly to electrical energy by electrochemically expanding alkali metal, preferably sodium metal, across a solid electrolyte. More particularly, this invention relates to such thermoelectric generators having a hermetically sealed feedthrough structure for an electrical conductor wire located between the positive electrode within the thermoelectric generator and a load external to the thermoelectric generator. The feedthrough structure of the invention electrically insulates the conductor wire from adjacent conductors not at the same potential.

BACKGROUND OF THE INVENTION

Exemplary thermoelectric generators and the principles of operation thereof have been described in U.S. Pat. Nos. 3,404,036 and 4,094,877, the disclosures of which are hereby expressly incorporated by reference. "Sodium heat engine" is the name commonly given to such thermoelectric generators which electrochemically expand sodium metal across the solid electrolyte. While other alkali metals may be employed in the generators of this invention, the sodium heat engine is described herein exemplary of these generators.

A sodium heat engine generally comprises a closed container separated into a first and second reaction zone by a solid electrolyte. Liquid sodium metal is present in the first reaction zone (i.e., on one side of the solid electrolyte) and the first reaction zone is maintained during operation of the device at a pressure higher than that of the second reaction zone. In the lower pressure second reaction zone, an electrically conducting permeable electrode is in contact with the solid electrolyte. During operation of the sodium heat engine, a heat source raises the temperature of the liquid sodium within the first reaction zone to a high temperature ($T_2$) and a corresponding high vapor pressure ($P_2$) which creates a sodium vapor pressure differential across the solid electrolyte. In response to this pressure differential, elemental sodium gives up electrons to an electrode in contact with the sodium metal and the resulting sodium ions migrate through the solid electrolyte. The electrons, having passed through an external load, neutralize sodium cations at the permeable metal electrode-solid electrolyte interface. Elemental sodium metal evaporates from the permeable electrode and migrates through the low pressure ($P_1$) second reaction zone, i.e., vacuum space to a low temperature ($T_1$) condenser. The condensed liquid sodium may then be returned back to the higher temperature reaction zone within the first reaction zone, e.g., by means of a return line and an electromagnetic pump, to complete a closed cycle. Thus, during operation of the device, sodium passes from the first reaction zone to the second and, where the device include means for returning the sodium back to the first reaction zone, the sodium completes the cycle. The process occurring in the electrolyte and at the sodium-electrolyte and electrode-electrolyte interfaces is nearly equivalent to an isothermal expansion of the alkali metal from pressure $P_2$ to $P_1$ at the temperature $T_2$. No mechanical parts need move, and the work output of the process is electrical only.

In order to draw electrical power from these generators, it is necessary to bring an electrical conductor wire from the permeable electrode in the low pressure space to an external load, i.e., the conductor wire must pass through the wall defining the low pressure space. A hermetically sealed feedthrough structure is employed to bring the conductor wire through the wall of the thermoelectric generator and electrically insulate the conductor wire from the wall which is generally not at the same potential as the wire. The feedthrough structure must be corrosion resistant to hot alkali metal and its vapors and any seals employed therein must remain hermetic in spite of the thermal cycling to which they are subjected during operation of the generator. Common to such feedthroughs is the use of an insulator which is dense, refractory, and sufficiently inert to hot alkali metal, such as dense pure aluminum oxide. Metal components, made of corrosion resistant metal such as stainless steel, may also be employed in combination with the insulator in electrical feedthroughs. In order to minimize the stresses in the feedthrough seals joining the insulator with the metal components, it is desirable to have a good match in the thermal expansivities of the metal and insulator components. Seals of mis-matched components are relatively susceptible to failure from thermal cycling. A simple conventional feedthrough may comprise a short length of insulator tube sealed into an opening in the cell wall. The wire passes through the opening in the insulator tube and a braze material is used to seal the tube.

Sharma in U.S. Pat. No. 3,847,675 discloses the use of a ceramic sheath of $Al_2O_3$ surrounding an electrical lead as it passes through the casing of a molten salt battery. The sheath is attached to the surface of the conductor wire interiorly and exteriorly of the bottom wall. U.S. Pat. No. 3,005,865 to Jonssen discloses a metallic tube surrounding the conductor as it passes through the battery wall having a tubular insert of glass between the metallic element and the conductor for insulation purposes. Dinin in U.S. Pat. No. 1,379,854 discloses a sleeve of or tube closely surrounding the conductor as it passes through the wall wherein the tube is formed of a celluloid material. Callender in U.S. Pat. No. 687,121 shows an insulating tube concentrically arranged around the battery and interposed between it and a carbon cylinder.

Different portions of the walls defining the low pressure space can be either hot (700°–1000° C.) as when they are coupled to the heat source, or cool (100°–500° C.) as when they are part of the condenser or heat sink. Locating a feedthrough at a "cool" wall is advantageous in that less stress is placed on the metal-insulator seals when using feedthroughs of conventional design. However, alkali metal vapor can condense to form an electrically conductive liquid film bridging across the insulator from the conductive wire to the wall. Since the conductor is at the positive potential of the electrode and the wall is usually at the negative potential of the cell, this liquid film will short out the cell. On the other hand, locating a feedthrough at a "hot" wall assures that no liquid alkali metal will condense across conventional insulator elements to cause a short circuit, but due to the higher temperatures the feedthrough components are then subjected to greater thermal stress and corrosion by both air and sodium vapor.

BRIEF DESCRIPTION OF THE INVENTION

This invention relates to a thermoelectric generator adapted to convert heat energy from a heat source to electrical energy, which comprises: (1) means for enclosing a first reaction zone; (2) means for enclosing a second reaction zone comprising a wall at least partially enclosing the second reaction zone; (3) a reaction zone separator which (a) separates and substantially completes enclosure of the first and second reaction zones and (b) comprises a cationically-conductive, solid electrolyte that is essentially impermeable to elemental alkali metal and compounds thereof and ionically conductive with respect to cations of said alkali metal; (4) elemental alkali metal within the first reaction zone and in fluid, (i.e., liquid and/or vapor) communication with the solid electrolyte; (5) an electrode within the second reaction zone in electrical contact with the solid electrolyte and sufficiently permeable to permit alkali metal vapor to pass therethrough; (6) means for conducting electron flow between the elemental alkali metal within the first reaction zone and the positive electrode in the second reaction zone, which means comprise a conductor wire located between the positive electrode and a load external to the second reaction zone; (7) inlet means for introducing the alkali metal into the first reaction zone; (8) means for maintaining a temperature in the first reaction zone at least 100° C. in excess of the lowest temperature in the second reaction zone; and (9) a hermetically sealed feedthrough structure for the conductor wire located comprising:

(a) an electrically insulating ceramic tube disposed substantially concentrically about the conductor wire, the ceramic tube (i) extending through the wall and (ii) and having its end positioned in the second reaction zone sufficiently near the heat source to prevent condensation of the alkali metal thereon during operation of the generator;

(b) first and second metal tubes, not in electrical contact with each other, disposed, preferably concentrically, about the exterior surface of the ceramic tube, the first metal tube (i) extending axially along the ceramic tube from a point outside the wall of the generator through the wall and forming a hermetic seal therewith and (ii) being hermetically sealed to the ceramic tube at a point outside the generator, and the second metal tube being axially spaced from the first metal tube and being located exterior to the wall, one end of the second metal tube being located in proximity to the exterior end of the ceramic tube and the other end being hermetically sealed to the ceramic tube; and (c) means, preferably comprising a metal end cap, for hermetically sealing the wire to the one end of the second metal tube.

Preferably, the inlet means comprise a return line and a pumping means for returning alkali metal condensed in the second reaction zone to the first reaction zone.

Advantageously, the feedthrough structure may be located at a cool wall without the danger of a short circuit developing. Locating the feedthrough at a cool wall makes the metal-insulator seals less susceptible to thermal cycling between the high operating temperatures of the generator and ambient temperatures, which often results in failure of conventional feedthrough seals. Additionally, the metal-insulator seals of the invention feedthrough are located outside the cell walls which further lessens the degree of thermal cycling of the seals. The location of the seals exterior to the wall of the generator as well as the location of the feedthrough at a "cool wall" reduce the corrosive effect of air and alkali metal on the insulator-metal seals.

BRIEF DESCRIPTION OF THE DRAWINGS

FIG. 1 is a schematic diagram, partially in cross section, of an exemplary thermoelectric generator comprising a feedthrough according to the present invention.

FIG. 2 shows, in vertical cross section, the feedthrough structure shown in FIG. 1.

FIGS. 3 and 4 show, in cross section, preferred embodiments of the feedthrough structures of the present invention.

DETAILED DESCRIPTION OF THE INVENTION

The invention may be described by referring to FIG. 1 wherein one embodiment of the thermoelectric generator comprising the feedthrough structure according to the present invention is shown in vertical cross section. The device comprises a chemically resistant tube 1, e.g., stainless steel, ceramic, etc. A vacuum tight seal of tube 1 is provided by means comprising cover plate 9, which is made of stainless steel or other chemically resistant material, and threads, bolts, or other conventional attaching means, or sealing means, not shown. Positioned inside tube 1 and affixed to cover plate 9 is a smaller tube 2 which comprises solid electrolyte. Tube 2 is filled, partially or completely, with alkali metal 7, preferably, sodium. Portions of the outer surface of electrolyte tube 2 are provided with a thin electrically conductive electrode 3 which is permeable enough to permit sodium to pass therethrough and sufficiently thick and continuous to conduct electricity. Electrode 3 is shown disproportionately thick in relation to other components to facilitate its location and identification. Tube 1 is provided with an outlet conduit 4 having a valve 5. A vacuum pump, not shown, is connected to conduit 4 for reducing the pressure in tube 1.

The device also is adapted to receive heat from a heat source. Specifically, the thermoelectric generator is adapted to receive heat to maintain the temperature of the sodium within tube 2 at least 100° C. in excess of the lowest temperature in tube 1. In the device shown in FIG. 1, a heater 6 is disposed about the side walls of tube 1. Alternatively, a heating device (not shown) disposed within a tube may be immersed in the alkali metal in tube 2. Other means suitable for heating are known to those skilled in the art.

Where it is desired that the return line act as part of the means for conducting electron flow between the elemental alkali metal in tube 2 and electrode 3, the return line contacts alkali metal 7 within tube 2. A negative lead 8 to an external circuit, not shown, is connected to pump 13 and the generator wall. Alternatively, a negative lead may comprise a chemically resistant metal wire (not shown) which extends through cover plate 9. Positive lead 10, e.g., a copper wire, to the external circuit passes through electrically insulating feedthrough 11 which extends through the bottom wall of tube 1, the positive lead 10 being in electrical contact with electrode 3. Alternately, the feedthrough may be located at a side wall or top wall of the second reaction zone, cover plate 9 being considered herein a wall of the second reaction zone of the generator.

In operation of the device, tube 1 is evacuated by pumping means through conduit 4 to a pressure lower than about 0.1 Torr, preferably lower than about 0.001 Torr, and then sealed. Alkali metal, e.g., sodium, within tube 2 is heated to a temperature of 300° C. or greater, e.g., 300° C.–1000° C., for example by heating a portion of the outside wall of the thermoelectric generator in a furnace, while another portion of the generator, (e.g., the lower end of tube 1) is maintained at least 100° C. below that temperature, e.g., by means including thermal exchange with the ambient temperature air or other coolant fluids. A difference in alkali metal vapor pressure on the two sides of the electrolyte results in the creation of difference of electrical potential across the electrolyte. As electrons flow through the external circuit, alkali metal 7 passes through electrolyte 2 in the form of cations which then accept electrons from electrode 3 and return to the elemental state.

If the lower part of tube 1 is maintained at sufficiently low temperature, the alkali metal condenses there and pressure in outer tube 1 becomes the vapor pressure of the alkali metal modified by any vapor pressure drop produced by the mass flow of the alkali metal from electrode 3 to the cooler walls of tube 1. In continuous operation, the condensed alkali metal in the bottom of the generator may be returned to the first reaction zone in tube 2 by means comprising a return line 14 which extends through cover plate 9 into tube 2. An electromagnetic pump 13 is located in line 14 to pump the sodium within the return line to tube 2. Preferably, the return line is located within the second reaction zone according to the improvement of the invention described in the commonly assigned and concurrently filed application U.S. Ser. No. 614,421, entitled "Internal-Integral Sodium Return Line For Sodium Heat Engine" to Thomas Hunt.

The preferred alkali metal reactant is sodium. However, potassium, and other alkali metals can be used if the electrolyte is of compatible material. Solid electrolyte employed in the reaction zone separator in the device of this invention may be glass, ceramic or polycrystalline ceramic material. Among the ceramics which may be used for such devices and which demonstrate an unusually high resistance to attack by alkali metal are beta and beta"-alumina. Such materials are well known in the art and discussed in U.S. Pat. No. 4,094,877 which is herein incorporated by reference. The electrode is permeable enough to permit the alkali metal vapors to pass therethrough but of sufficient thickness to conduct electricity. It may comprise, for example, a thin conducting layer of platinum bright paint comprising platinum chloride, or molybdenum films applied by sputtering or by such means as those described in U.S. Pat. No. 4,049,877 to Saillant et al, hereby incorporated by reference.

While FIG. 1 illustrates one embodiment of the invention, other embodiments of the thermoelectric generator are likewise useful. For example, the generator may include two or more electrolyte elements connected in series, and the electrical feedthrough and positive conductor wire may be located at another place of the wall, e.g., the feedthrough may extend through cover plate 9.

This invention may be best understood by referring to FIG. 2 wherein the hermetically sealed feedthrough structure of FIG. 1 is illustrated in vertical cross-section. The feedthrough in FIG. 2 comprises an electrically insulating ceramic tube 21 disposed substantially concentrically about conductor wire 26. This ceramic tube 21 extends through the wall 22 of the generator. Axially spaced about the exterior surface of ceramic tube 1 are metal tubes 23 and 24 which are not in electrical contact with each other. The first metal tube 23 extends axially along ceramic 21 from a point outside wall 22 of the generator through the wall and forms a hermetic seal therewith. The vacuum chamber walls 22 are generally metal and are sealingly attached to the first metal tube by any known method. For example, a metal weld flange 28 comprising, e.g., stainless steel may be employed which is hermetically sealed to first metal tube 23 and chamber wall 22 by means of a sealant such as nickel based braze. The first metal tube is sealed to ceramic tube 21 at a point 23(a) outside the generator. The second metal tube 24 is spaced axially from the first metal tube 23 and located exterior to wall 22. One end 24b of the second metal tube is located in proximity to the exterior end 21b of the ceramic tube and the other end 24a of the metal tube being hermetically sealed to ceramic tube 21. The metal tubes 23 and 24 are hermetically sealed to ceramic tube 21 at positions 23a and 24a, respectively, by means of ceramic-metal sealant 27 such as an active metal braze or an insulating glass or glass ceramic material. Means 25 hermetically seal wire 26 to the non-attached end 24b of second metal tube 24, and preferably comprise a metal end cap. Alternatively, the means for sealing wire 26 to the second metal tube may comprise a sealant such as a nickel braze.

The length of tubes 23 and 24 relative to the ceramic tube is not critical as long as each is of sufficient length to provide a good seal between itself and the components of the feedthrough. It is preferred that the length of tube 23 in the vacuum space be approximately equal to the length of the ceramic tube within the vacuum space, so as to add structural stability to this portion of the ceramic tube. Tube 23 extends outside wall 22 which allows the metal-ceramic seal between tube 23 and the ceramic tube to be made outside the generator. This alleviates some of the thermal cycling that such metal-ceramic seals would otherwise be subjected to. Additionally, the axial distance between tubes 23 and 24 should be sufficient to prevent any electrical conductivity between these metal tubes. The length of tube 24 may vary so that the end 24b is either equal with, extended or recessed relative to the end of the ceramic tube 21b. The ceramic tube and the metal tubes are of radial dimension which allows for sufficient structural stability. Preferably, the radial dimension of these components relative each other and the conductor wire allow minimum free space between these components yet allow convenient assembly of the feedthrough structure. Selection of the optimal dimensions for the components would be within the skill of those in the art. Means for hermetically sealing wire 26 to one end 24b of the metal tube 24 preferably comprise a metal end cap 25. The metal end cap 25 comprises suitable metals such as, e.g., stainless steel, and is sealingly affixed to both the second metal tube and to the conducting wire by means of any suitable sealant, for example, nickel based braze.

The ceramic tube 21 extends to a location in the second reaction zone of the generator sufficiently near the heat source so that at least the end 21a of the ceramic tube is heated to be at a temperature sufficient to prevent condensation of the alkali metal on this end during operation of the generator. By positioning the ceramic tube in such a manner within the second reaction zone of the generator, alkali metal is prevented from condensing on this end and shorting out the cell by bridging between the conductor wire and the metal tube 23. This advantage is achieved even if the feedthrough passes through a "cool" wall of the generator. The ceramic insulating tube is dense, refractory, and substantially inert to hot alkali metal, being made from, for example, a material such as dense, pure aluminum oxide. The metal tubes 23 and 24 may be made of any alkali resistant material, including materials such as Kovar or tantalum.

In FIG. 3, metal tubes 33 and 34 are disposed about ceramic tube 31. End cap 35 is hermetically sealed to conductor wire 36 and second metal tube 34. Weld flange 38 is hermetically sealed to first metal tube 33 and generator wall 32. In FIG. 4, ceramic tube 41 is disposed about conductor 46. End cap 45 is hermetically sealed to conductor wire 46. End cap 45 is hermetically sealed to first metal tube 43 and generator wall 42. FIGS. 3 and 4 show preferred embodiments of the feedthrough structure of this invention wherein the first and second metal tubes surrounding the insulating ceramic tube have flanges, directed either radially inwardly (as are flanges 33a in FIG. 3) or radially outwardly (as are flanges 34a in FIG. 3 and flanges 43a and 44a in FIG. 4), at those ends which are affixed to the ceramic tube. These flanges allow for a more convenient and optimal hermetic sealing of the ceramic tube to the metal tubes. In the embodiment shown in FIG. 3, since the sealing material 37 is disposed continuously between flanges 33a and 34a, this sealing material must be of an electrically insulating nature. In the embodiment shown in FIG. 4, the sealing material 47 is not continuous between flanges 43a and 44a and thus the sealing material may be of any suitable sealing material including an active metal braze. However, if the sealant is disposed so as to be continuous between the flanges of the metal tubes, an insulating seal material, e.g., glass would need to be employed.

The composition of the metal and ceramic components of the feedthrough are chosen to be closely matched in thermal expansivity. However, by the design of the feedthrough of this invention, ceramic metal seals are not exposed to the high operating temperatures of the cell and the seals are less susceptible to amplitudes of thermal cycling. Thus, the matching of components in this invention feedthrough is less critical than in conventional feedthroughs, such that high expansivity but otherwise appropriate metals, such as nickel and stainless steel, may be used in the feedthrough with the lower expansivity alumina ceramics. Selection of appropriate materials for the ceramic tube, metal tubes, and sealants therefor would be well within the skill of those in the art.

EXAMPLE

A feedthrough was constructed according to the design in FIG. 3. The first and second metal tubes were tantalum, 0.250 inches outer diameter (O.D.) and 0.010 inches wall thickness. The insulating tube was dense, gas impervious aluminum oxide grade 998 of McDanel Refractory Co., Beaver Falls, Pa. The dimensions were O.D. 0.219 inches; inner diameter (I.D.) 0.109 inches; length 6.0 inches. The center conductor was 0.100 inch O.D., (oxygen free high conductivity) copper rod. The end cap and weld flange (38 of FIG. 3) were machined from type 304 stainless steel so that their O.D.'s were 0.375 inches and 0.800 inches, respectively.

To assemble the feedthrough, the weld flange and the end cap were vacuum brazed to the first and second tantalum tube, respectively 1.5 in. from the ends of each where the ceramic-metal seal was to be made. The braze material was #125 Nicrobraz, trademark of and available from Wall Colmonoy Corp., Detroit, MI. The feedthrough components were then disposed as shown in FIG. 3 and the copper conductor vacuum brazed into the hole in the end cap with Nicrobraz LM (trademark of Wall Colmonoy Corp.). A glass frit was applied in the cavity produced by the flared end of one of the tantalum tubes and, while maintaining a vertical orientation, both tantalum tubes were sealed to the alumina tube by heating the glass with a heater in vacuuo and allowing it to melt and flow into the crevices betweeen the metal tubes and ceramic tube before cooling. The composition of the glass was 36.4% CaO, 45% $Al_2O_3$, 4.7% MgO and 13.9% BaO. The sealing temperature was about 1400° C. The feedthrough was welded via the weld flange into the bottom plate of an end-condensed sodium heat engine cell. The center copper conductor of the feedthrough was attached between an electrode at 800° C. or hotter and a load at room temperature. During operation of the sodium heat engine, and seals of the feedthrough assumed a temperature of about 250° C. This cell operated for over 11,000 hours total at an output current of 20 amp., and was subjected to at least five cycles between operating temperature and room temperature.

In view of this disclosure, many modifications of this invention will be apparent to those skilled in the art. It is intended that all such modifications which fall within the true scope of the invention will be included within the terms of the appended claims.

I claim:

1. A thermoelectric generator adapted to convert heat energy from a heat source to electrical energy, which comprises:
   (1) means for enclosing a first reaction zone;
   (2) means for enclosing a second reaction zone, said second reaction zone enclosure means comprising a wall, at least partially enclosing said second reaction zone;
   (3) a reaction zone separator which
      (a) separates and substantially completes enclosure of said first reaction zone and said second reaction zone, and
      (b) comprises a cationically-conductive, solid electrolyte that is essentially impermeable to elemental alkali metal and compounds thereof and ionically conductive with respect to cations of said alkali metals;
   (4) elemental alkali metal within said first reaction zone and in fluid communication with said solid electrolyte;
   (5) an electrode within said second reaction zone in electrical contact with said solid electrolyte and sufficiently permeable to permit alkali metal vapor to pass therethrough;
   (6) means for conducting electron flow between said elemental alkali metal within said first reaction zone and said electrode, which means comprises a conductor wire located between said electrode and a load external to said second reaction zone;
   (7) inlet means for introducing said alkali metal into said first reaction zone;

(8) means for maintaining a temperature in said first reaction zone at least 100° C. in excess of the lowest temperature in said second reaction zone; and (9) a hermetically sealed feedthrough structure for said conductor wire comprising:

(a) an electrically insulating ceramic tube disposed concentrically about said electrical conductor wire, said ceramic tube (i) extending through said wall, and (ii) having its end positioned in said second reaction zone sufficiently near the heat source so that at least said end of said ceramic tube is heated to be at a temperature sufficient to prevent condensation of said alkali metal thereon during operation of said generator;

(b) first and second metal tubes, not in electrical contact with each other, disposed about the exterior surface of said ceramic tube, said first metal tube (i) extending axially along the ceramic tube from a point outside said wall of said generator through said wall and forming a hermetic seal therewith, and (ii) being hermetically sealed to said ceramic tube at a point outside said generator, and said second metal tube being axially spaced from said first metal tube and extending axially along said ceramic tube exterior to said wall, one end of said second metal tube being located in proximity to the exterior end of said ceramic tube and the other end being hermetically sealed to said ceramic tube; and (c) means for hermetically sealing said wire to said one end of said second metal tube.

2. A generator according to claim 1, wherein a flange extends radially outwardly from the ends of said first and second metal tubes, those ends being in axial proximity to each other.

3. A generator according to claim 2, wherein said first metal tube or said second metal tube is sealed to said ceramic tube by means of a sealant selected from an insulating glass, an insulating glass-ceramic, or an active metal braze.

4. A generator according to claim 1, wherein a flange extends radially outwardly from the end of said second metal tube nearest said first metal tube, and a flange extends inward from the end of the said first metal tube nearest said second metal tubes.

5. A generator according to claim 4, wherein said ceramic tube is affixed to said first metal tube and said second metal tube by means of a sealant selected from an insulating glass or glass-ceramic.

6. A generator according to claim 1, wherein said insulating ceramic tube comprises alpha-alumina.

7. A generator according to claim 1, wherein said first metal tube is selected from tantalum or stainless steel.

8. A generator according to claim 1, wherein said means for hermetically sealing said wire to said second metal tube comprises a metal end cap.

9. A generator according to claim 8, wherein said metal end cap is attached to said second metal tube and said conductor wire by means of a nickel based braze.

10. A generator according to claim 1, wherein said metal end cap is stainless steel.

* * * * *